Sept. 21, 1965  D. D. ZEBLEY ETAL  3,207,290
DRIVE FOR TROLLEY CONVEYOR SYSTEM
Original Filed Aug. 5, 1963  3 Sheets-Sheet 2
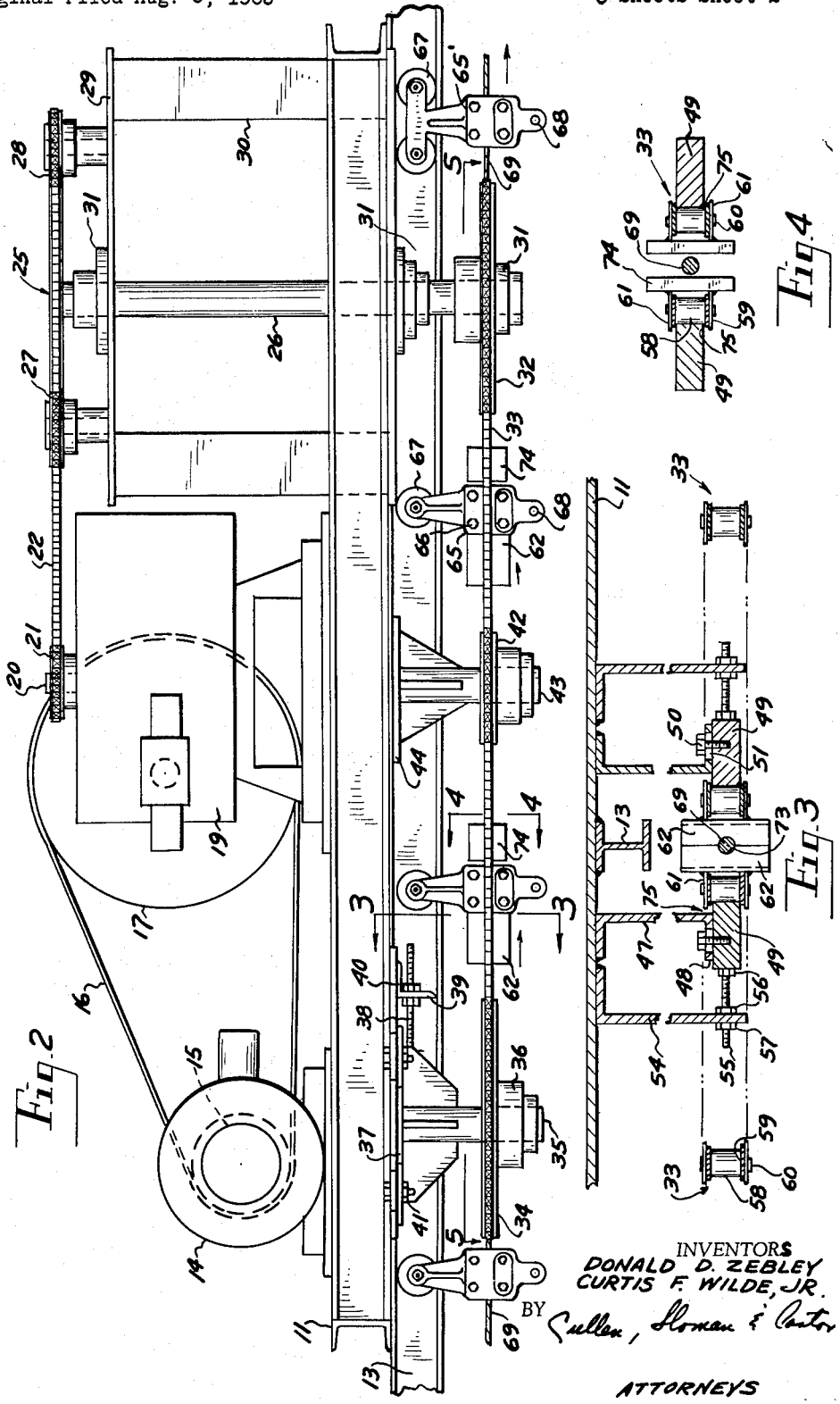
INVENTORS
DONALD D. ZEBLEY
CURTIS F. WILDE, JR.
BY Cullen, Sloman & Cantor
ATTORNEYS Sept. 21, 1965   D. D. ZEBLEY ETAL   3,207,290
DRIVE FOR TROLLEY CONVEYOR SYSTEM
Original Filed Aug. 5, 1963   3 Sheets-Sheet 3
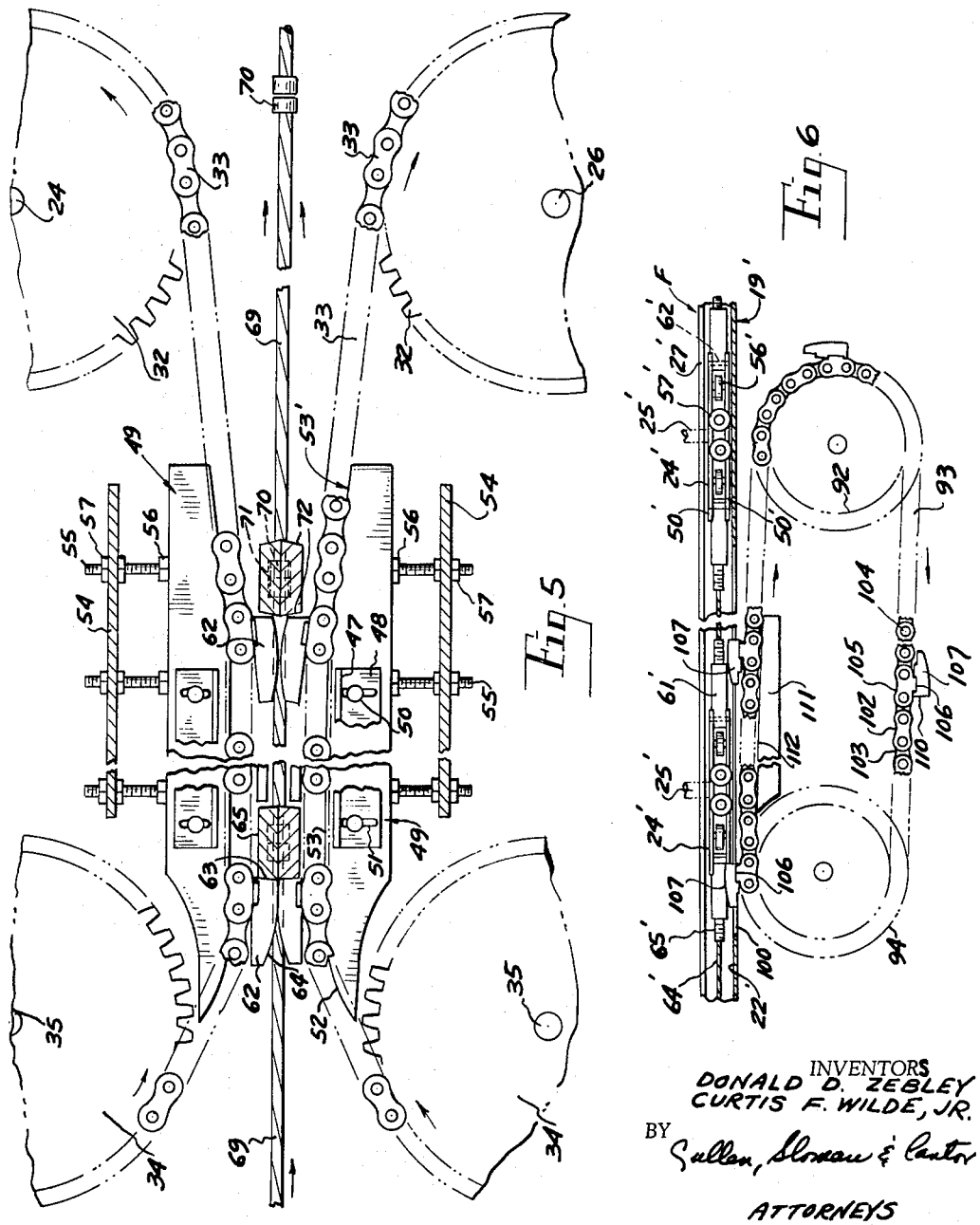
INVENTORS
DONALD D. ZEBLEY
CURTIS F. WILDE, JR.
BY
*Cullen, Sloman & Cantor*
ATTORNEYS

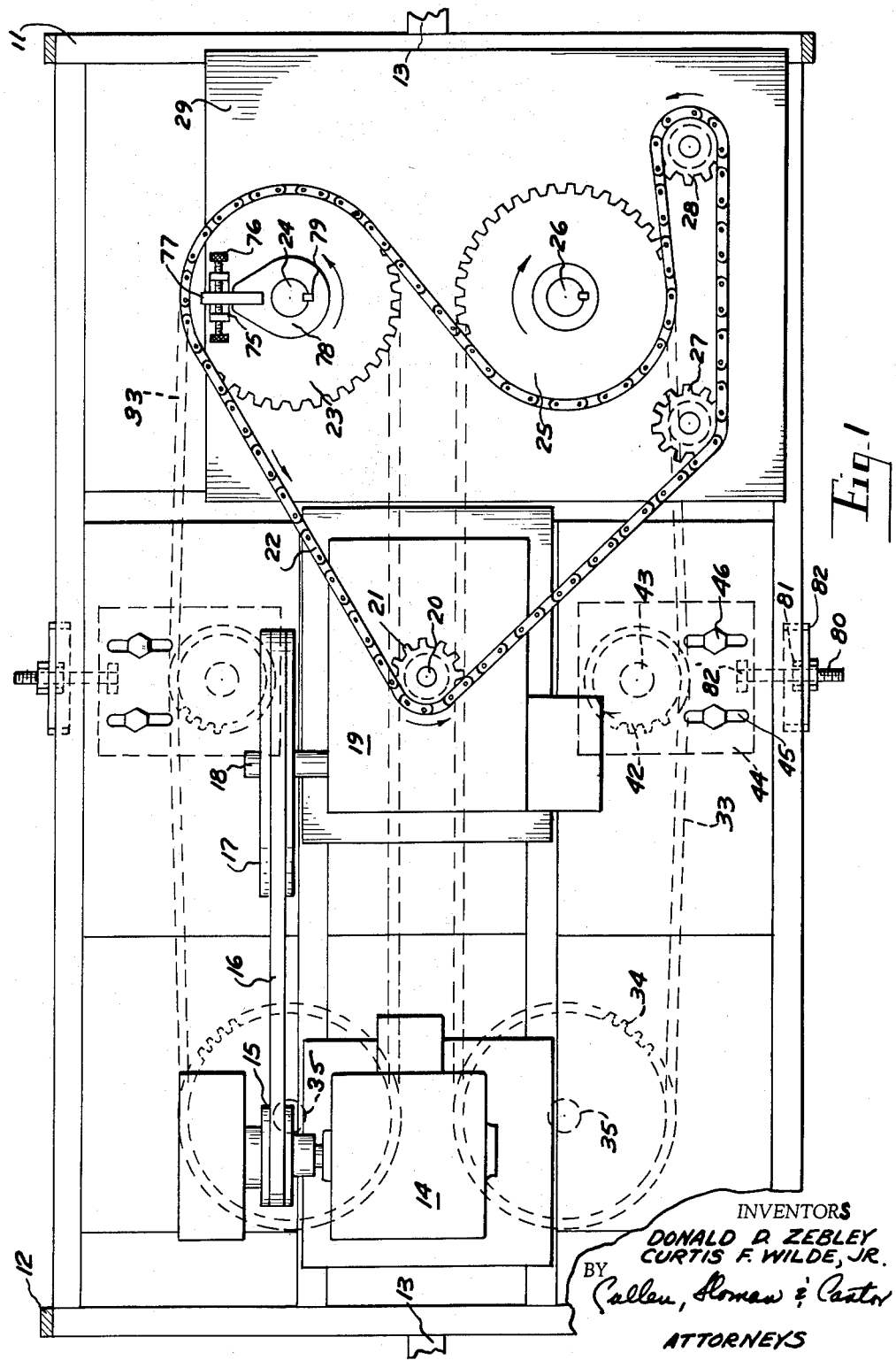

United States Patent Office 3,207,290
Patented Sept. 21, 1965

3,207,290
DRIVE FOR TROLLEY CONVEYOR SYSTEM
Donald D. Zebley, 12 Andrews St., Greenville, S.C., and Curtis F. Wilde, Jr., Greenville, S.C.; said Wilde assignor to said Zebley
Continuation of application Ser. No. 299,958, Aug. 5, 1963. This application Mar. 17, 1965, Ser. No. 443,769
10 Claims. (Cl. 198—177)

This is a continuation of our copending application Serial No. 299,958, filed August 5, 1963, now abandoned, entitled Caterpillar Drive For Trolley Conveyor System. Copending application Serial No. 299,958, filed August 5, 1963, is a continuation-in-part of our copending patent application Serial No. 116,213, filed April 7, 1961, entitled Conveyor, now Patent No. 3,103,896.

This invention relates to a drive for a series of longitudinally spaced conveyor trolleys movably carried by a track and interconnected by cable.

An important object of the present invention is to provide an improved drive construction for a trolley conveyor system which incorporates a pair of caterpillar drive assemblies, each including a sprocket chain carrying a sereis of longitudinally spaced dogs providing a means by which the opposed dogs arranged upon opposite sides of the trolley conveyor system are adapted to intermittently effect driving engagement of the successive trolleys.

It is another object to provide an improved caterpillar drive with means for urging the dogs into opposed driving and engaging registry with the respective longitudinally spaced trolleys.

These and many other objects will be seen from the following specification and claims in conjunction with the appended drawings in which:

FIGURE 1 is a fragmentary plan view of the present caterpillar drive showing the power drive.

FIGURE 2 is a fragmentary side elevational view thereof.

FIGURE 3 is a fragmentary section taken in the direction of the arrows 3—3 of FIGURE 2, on an increased scale.

FIGURE 4 is a fragmentary section taken in the direction of the arrows 4—4 of FIGURE 2, on an increased scale.

FIGURE 5 is fragmentary section taken in the direction of the arrows 5—5 of FIGURE 2, illustrating the caterpillar drives, on an increased scale.

FIGURE 6 is a fragmentary side elevational view of a slightly different form of caterpillar drive as shown in copending patent application 116,213 relating to a cable conveyor.

It will be understood that the above drawings illustrate merely a preferred embodiment of the invention, and that other embodiments are contemplated within the scope of the claims hereafter set forth.

Power drive

A guide means is provided which consists of an elongated tubular body 19' having a bottom wall and a top wall defining a channel within which are movably mounted a series of longitudinally spaced conveyor assemblies 24'. Said top wall is flush with or adjacent floor surface F, being longitudinally slotted at 27' to receive depending pin 25' which extends from a carriage or any other object upon surface F which is to be moved thereover by said conveyor assembly, FIGURE 6.

Each conveyor assembly includes a pair of opposed vertically spaced plates 50' suitably interconnected. Interposed between said plates are opposed pairs of longitudinally spaced rollers 56' journaled upon vertical axes for cooperative guiding engagement with the side walls of guide channel 19'. Also, there are included opposed pairs of longitudinally spaced rollers 57' adapted to engage the bottom surface 22' of the guide channel.

The conveyor elements 24' are interconnected by a series of cable elements 64' which have threaded end portions 65' which project within connectors 61', swivelled at 62' to the respective opposite ends of each conveyor assembly.

Sprocket wheel 92 has spaced forwardly thereof an idler sprocket 94, there being a suitable power source connected to sprocket 92 for rotating the same.

The driving sprocket chain 93 which is the primary motive force for the conveyor assembly extends around the drive sprocket 92 and the idler driven sprocket 94 and is positioned directly below and centrally of the elongated rectangular opening 100, FIGURE 6, which is disposed below and closely adjacent the conveyor guide means 19', at which point the bottom plate 22' has been removed providing access of the sprocket chain driven dogs 107 to the respective longitudinally spaced flights 24' of the conveyor assembly as a means of longitudinally driving the same within the guide channel above described.

This drive mechanism is shown in FIGURE 6, wherein the sprocket chain 93 is shown as consisting of a series of opposed spaced links 102, pivotally interconnected by the spacer links 103 and the conventional pivot pins 104.

A series of longitudinally spaced dogs, generally indicated at 107, are fixedly secured to the sprocket chain 93 at spaced intervals throughout its length, corresponding to the spacing of the conveyor flights 24'.

The assembly of the dogs includes the links 105, corresponding to links 102 whose upper edges terminate in the out-turned supports 106, which supports are suitably secured within transverse notches in the undersurface of dog 107. Said dog has a front face adapted to operatively engage a carrier flight 24'.

The assembly of the sprocket chain is completed by the transverse pin 104 which extends through the outer connector plates 105, the inner connector links 103 and the conventional spacer rollers, forming a part of the sprocket chain 93, the pin 104 being retained in position by a suitable cotter pin or similar fastener.

As shown in FIGURE 6, it is noted that the power driven sprocket 92 has its center displaced below the center of rotation of the idler sprocket 94, so that the top flight of the sprocket chain 93 moving in the direction of the arrows moves to the right and downwardly to permit disengagement of the dog 107 from the flight of the conveyor assembly.

For this purpose and to assist in this operation, there is provided as a part of the power drive framework, the horizontally disposed inclined guide plate or push-out bar 111 which underlines the upper flight of the sprocket chain 93 as shown in FIGURE 6, and serves as a support therefor during a portion of the driving engagement of the dog 107 with respect to the individual flight 24' of the conveyor assembly.

It is seen accordingly, as the dog 107 moves to the right as a part of the continuous sprocket chain 93, that it will gradually disengage itself from the flight in front thereof at approximately the same moment as the next succeeding dog 107 engages the next succeeding flight, forming a part of the conveyor assembly with the said dog 107 arranged adjacent the drive wheel 94, being the dog which transmits the longitudinal driving force to the individual conveyor directly adjacent thereto. Thus, it is noted that the power from the driven sprocket chain is transmitted centrally to the series of flights of the conveyor assembly, substantially in alignment with the longitudinal center line of the flight and the corresponding center line of the wire rope connectors 64' therebetween. In other words, the power is transmitted through the longitudinal center of the load. The individual flight as shown in FIGURE 6, is connected to a load by means of the retractable pin 25', which depends from the load movably mounted upon floor surface F. Thus, the power is transmitted to the respective flights of the conveyor along the center line thereof as distinguished from the cantilever type of action which is employed in the conventional type of chain conveyors and wherein the driving chain as well as a part of the conveyor assembly carries the load from a center distance equal to the radius of the drive sprocket.

There are a number of advantages in the cable type conveyor assembly wherein the cable elements or wire ropes are employed for interconnecting the respective flights of the conveyor, as distinguished from chain conveyors wherein a chain is continuously operating in shear and eventually develops a permanent elongation of the chain due to wear of the respective parts and the connections.

On the other hand, the cable connections between the respective flights of the present conveyor always operating in tension and have a constructional elasticity permitting elongation of the cable element as the drive power is transmitted. Thus, the cable element which interconnects the said flight and the next succeeding flight therebehind is temporarily stretched; however, just as soon as the particular flight becomes disengaged from the dog which drove it, the said cable due to its constructional elasticity, automatically retracts to its original performed length and accordingly there is no permanent elongation in the cable and accordingly furthermore no need for a take-up mechanism as is always the case in the use of chain conveyors.

*Power drive*

Referring to FIGURES 1 through 5, the present trolley cable conveyor system includes the horizontal support 11 which in the illustrative embodiment is supported by a series of upright tie bars 12, FIGURE 1, from the ceiling of a building. The elongated track in the form of an I beam 13, extends under and is secured to support 11.

Motor 14, FIGURE 2, is mounted upon support 11 and its drive pulley 15 engages belt 16 which operates pulley 17 on input shaft 18 of gear reducer 19, whose output shaft 20 mounts sprocket 21. The latter drives sprocket chain 22 which extends around drive sprocket 23 connected to drive shaft 24, drive sprocket 25 connected to drive shaft 26 and the take-up or idler sprockets 27 and 28. This is to provide rotative motion in opposite directions to shafts 24 and 26.

The sprocket drive assembly is mounted upon platform 29 whose supports 30 engage support 11, FIGURE 2, shafts 24 and 26 being journaled and supported by flanged bearings 31. The respective shafts 24 and 26 at their lower ends carry the coplanar drive sprockets 32 as fragmentarily shown in FIGURE 5.

Each of these drive sprockets 32 is in engagement with a separate coplanar sprocket chain loop 33 which extends around a respective pair of arranged idler sprocket wheels 34 journaled and supported at 35.

*Caterpillar drive take-up*

A take-up is provided for the mounting of idler sprockets 34 anchored and retained upon the journal shafts 35 by flange bearings 36. Said shafts at their upper ends are connected to plates 37 which are adjustably secured for longitudinal adjustments upon the under surface of support 11 as by fasteners 41. Adjusting screws 38 extend through angle members 39 and at their forward ends are secured to the respective plates 37. Adjusting nuts 40 upon said screws provide a means of effecting longitudinal adjustments of plate 37, and in turn a means for regulating longitudinal adjustment of idler sprockets 34.

*Drive chain tension adjustment*

For each of the sprocket chains 33, there is provided a tension adjustment. Sprocket gear 42 is journaled upon support shaft 43 which depends from plate 44 slotted at 45 and secured by fasteners 46 upon support 11. Screw 80 with nuts 81 on bracket 82 provides for effecting transverse adjustments of sprocket 42 and the tension in the respective sprocket chain 33, FIGURES 1 and 2.

*Conveyor Construction*

The present trolley conveyor system includes track 13, fragmentarily shown, FIGURES 1 and 2, and a series of longitudinally spaced conveyor trolleys 65 and 65' movably suspended from the track, FIGURE 2, including suitable supporting wheels 67 which ride upon the opposing flanges of the track.

Each of the trolleys includes a pair of opposed bracket plates mounting a shell which for the conveyor trolleys 65 or 65' which are bolted together at 66 and which include the depending load support members 68.

The conveyors are preferably spaced equal distances apart along the segmented cable assembly as for example 24 inches or more exactly 24$\frac{1}{16}$ inches. Conveyor trolley 65 has a two-wheel support and conveyor trolley 65', a four-wheel support, FIGURE 2.

*Cable assembly*

The cable assembly consists of a series of short cable elements 69, FIGURES 2 and 5, of a predetermined length as, for example, 24 inches, and have secured upon their opposite ends the collars 70 which nest in longitudinal registry within cylindrical recesses 71 formed within the opposed pairs of bracket plates which form each trolley. Thus, when these plates are secured together, by bolts 66, adjacent cable elements 69 are secured end-to-end to make up the cable assembly and secure the conveyor trolleys to the cable assembly.

*Caterpillar drive*

The present caterpillar drive provides driving means for a series of longitudinally spaced conveyor trolleys 65-65' movably mounted upon track 13.

Each of the sprocket chains 33 are arranged coplanar and in a horizontal plane spaced below support 11, FIGURE 3, and arranged upon opposite sides of the series of conveyor trolleys, FIGURE 5.

A series of dogs 62 are mounted upon the respective sprocket chains 33, extend outwardly thereof, and have a spacing of 24 inches, for illustrations throughout the length of said chains which corresponds substantially to the spacing of trolleys 65-65' on the cable assembly. Said dogs are adapted to operatively and drivingly engage successively the respective trolleys on track 13.

*Push-out bar assembly*

Within the chain loops 33 respectively, there is provided, FIGURE 5, a pair of coplanar opposed push-out bars 49 which are adjacent said support 11, coplanar with and bearing against the respective chain loop. Bars 49 are laterally adjacent to the cable assembly for the purpose of guiding and positioning said drive chains and their connected dogs 62 for successive driving registry with the said conveyor trolleys respectively.

Brackets 47, FIGURES 3 and 5, are secured to support 11, as by welding, and at their lower ends have horizontal flanges 48 slotted at 51. The respective push-out bars 49 lie below flanges 48 and are adjustably secured thereto by fasteners 50.

A means is provided for adjusting said push-out bars inwardly or outwardly with respect to the trolley conveyor assembly.

Additional brackets 54 are provided upon the undersurface of support 11 which carry a series of longitudinally spaced parallel adjusting screws 55, whose stop nuts 56 operatively engage outer edge portions of push-out bars 49 and are secured in adjusted position by nuts 57, FIGURES 3 and 5.

Each of said push-out bars include the trailing cam portion 52 for guiding the sprocket chains 33 inwardly of idler sprockets 34. The push-out bars have intermediate straight line supporting portions 53 which are generally parallel for the purpose of retaining the respective chains and connected dogs 62 against and adjacent to the respective conveyor trolleys 65. Each of said push-out bars terminates in the outwardly tapered leading portion 53' which gradually extends outwardly from the conveyor assembly permitting the release of said dogs from the respective trolleys as the sprocket chain moves along said tapered portions 53'. This disengagement occurs at the instant that the next succeeding pair of dogs are in position, FIGURE 5, for engaging the next succeeding conveyor trolley.

Sprocket chain

Each of the sprocket chains 33 consists of a series of segments or opposed pairs of plates 59 with pairs of rollers 58 interposed and retained by conventional pins 60. Plates 59 extending laterally outward of rollers 58 to cooperatively engage upper and lower edge portions of the respective push-out bars 49, FIGURE 4, to retain the sprocket chain in lateral coplanar alignment with the respective push-out bar.

Each of the dogs 62 includes the outwardly extending plate 61 connected to plate 59 of the sprocket chain and which terminates in the main body of the inwardly directed drive dogs 62, FIGURE 3.

The chain loops 33 and the associated push-out bars 49 are so arranged that the dogs 62 actually come into cooperative engaging registry with each other during the period they drivingly engage the respective conveyor 65, FIGURE 5. The outer opposing surfaces of dogs 62 are slotted at 73, FIGURE 3, to engage around the respective cable element 69.

Referring to FIGURE 5, the leading edges of said dogs are tapered forwardly and outwardly at 63, and their exterior side edges are convex as at 64 for cooperative camming engagement.

The corresponding edges or driving shoulders of the conveyor trolleys 65 are similarly tapered at 72, FIGURE 5, in order to facilitate the lateral disengagement of the drive dogs therefrom as the next succeeding pair of drive dogs engage the next succeeding trolley. The respective dogs 62 will, in effect, slightly rotate with their cam surfaces 64 engaging each other to facilitate a friction-free disengagement and thus minimize wear of the dogs or conveyor element.

Anti-run-away dogs

Run-way dogs 74, FIGURES 2 and 4, are mounted and secured upon the respective sprocket chain 33 spaced slightly ahead of each of the respective conveyor trolleys 65–65' and are normally not operative unless the load upon the conveyor system is so great that the load has a tendency to cause relative movement of the conveyor vehicle assembly with respect to the driving chains 33. This may occur with heavy loads moving to different levels in a building. Said anti-run-away dogs would retain the conveyors and thus prevent any such run-away movement.

The respective opposed dogs 62 connected with the corresponding coplanar chain drive loops 33, are normally arranged at a spacing which is substantially equal to the spacing of the respective conveyor trolleys 65. Should for any reason the dogs 62 become out of lateral alignment, a construction is provided, as shown in FIGURE 1, by which the drive sprocket 23 and its associated driven shaft 24 may be adjusted with respect to each other. For this purpose, there is provided upon the outer surface of sprocket 23 a pair of spaced stops 75; and adjustably projected through said stops are a pair of adjusting screws 76. The yoke 78 is secured at 79 to shaft 24 for rotation therewith. The yoke includes the projecting element 77 which extends between stops 75 and the inner ends of adjusting screws 76. By adjusting said screws 76, sprocket 23 may be rotatively or angularly adjusted with respect to shaft 24. This means that said shaft and the connected driven sprocket 32, FIGURE 5, may be angularly adjusted with respect to the non-adjustable other driven sprocket 32 and thus provides a means by which the drive dogs 62 may be arranged in perfect lateral alignment.

Operation

The distance between the driven surfaces of trolleys 65 is consistently 1/16" greater than that between the driving surfaces of dogs 62. The 1/16" greater distance between trolleys is most prevalent entering the drive—each cable link thus enters the drive under "full working tension."

As shown in FIGURE 5, the front face of a dog 62 approaches a trolley 65 on an arcuate path. As a result, each successive face will fall behind its adjacent trolley even though the distance between successive dogs is less than the cable distance between successive trolleys.

At the instant that driving dogs 62 firmly pick up each succeeding trolley 65 (as it enters the drive) the action on the cam portion 52 of push-out bar 49 effect complete pressure relief on the forward driven trolley which, at this time, is ready to enter the outwardly tapered area 53 of push-out bar 49. From here, the dogs 62 (on each side) liiterally walk completely away from the trolleys 65.

With the distance between driven elements (trolleys 65) being slightly greater than the distance between driving elements (dogs 62), the result is a complete friction free disengagement of hte trolleys 65 from the drive dogs 62—with the cable retracting slightly (through its constructional elasticity) and taking up the slack for a surge free vehicle operation.

In other words, a cable link, through its inherent nature, has in fact, a built in take-up of its own. As distinguished from this, a chain has ever increasing permanent elongation through its multiple wear points, every few inches (links and pins).

Now having described our invention, reference should now be had to the claims which follow.

What is claimed is:

1. In a trolley conveyor system including a track, a series of longitudinally spaced conveyor trolleys movably carried by the track, and a movable cable assembly to which the trolleys are secured, the improvement comprising:

support means fixed with respect to said track;
    a first power driven sprocket and a second longitudinally spaced sprocket carried by said support means laterally of said track,
    a sprocket chain loop interconnecting said sprockets;
    a series of longitudinally spaced drive dogs on said chain extending outwardly thereof so as to operatively and drivingly engage successively the respective trolleys on said track;
    and a chain push-out bar adjacent said support bearing against the chain loop, adjacent said cable assembly for maintaining said chain and connected dogs in successive driving registry with said conveyor trolleys respectively, said movable cable assembly including a series of unit cable elements at their ends secured to and flexibly interconnecting adjacent pairs of conveyor trolleys, and an enlarged head secured upon opposite ends of each cable element, the heads on the ends of adjacent cable elements being nested and secured within a pair of trolley brackets and fixed against longitudinal movement in either direction.

2. In a trolley conveyor system including a track, a series of longitudinally spaced conveyor trolleys movably suspended from the track, and a movable cable assembly to which the trolleys are secured, the improvement consisting of a caterpillar drive comprising:

a support fixed with respect to said track;

a power driven sprocket and a longitudinally spaced coplanar idler sprocket journaled upon said support laterally of said track;

a sprocket chain loop interconnecting said sprockets;

a series of longitudinally spaced drive dogs on said chain extending outwardly thereof adapted to operatively and drivingly engage successively the respective trolleys on said track;

and a chain push-out bar adjacent said support bearing against the chain loop, adjacent said cable assembly for maintaining said chain and connected dogs in successive driving registry with said conveyor trolleys respectively, said movable cable assembly including a series of unit cable elements at their ends secured to and flexibly interconnecting adjacent pairs of trolleys, the spacing of said drive dogs being slightly less than the spacing of said trolleys, the dog then driving one trolley placing the connected and trailing cable element under tension slightly elongating the same, the next succeeding dog in engaging the next succeeding trolley taking up this tension relieving the leading cable element and trolley and providing a friction-free disengagement thereof from its driving dog as it moves along the line of conveyor movement.

3. In a trolley conveyor system including a track, a series of longitudinally spaced conveyor trolleys movably suspended from the track, and a movable cable assembly to which the trolleys are secured, the improvement comprising:

support means fixed with respect to said track;

a first power driven sprocket and a second longitudinally spaced sprocket carried by said support means laterally of said track;

a sprocket chain loop interconnecting said sprockets;

a series of longitudinally spaced drive dogs on said chain extending outwardly thereof adapted to operatively and drivingly engage successively the respective trolleys on said track;

and a chain push-out bar adjacent to said support bearing against the chain loop, adjacent said cable assembly for maintaining said chain and connected dogs in successive driving registry with said conveyor trolleys respectively, and a series of anti-run-away dogs on said sprocket chain spaced forwardly of each of said driving dogs normally spaced respectively from the conveyor being driven.

4. In a trolley conveyor system including a track, a series of longitudinally spaced conveyor trolleys movably carried by the track, and a movable cable assembly to which the trolleys are secured, the improvement comprising:

support means fixed with respect to said track;

a first power driven sprocket and a second longitudinally spaced sprocket carried by said support means laterally of said track;

a sprocket chain loop interconnecting said sprockets;

a plurality of spaced driving shoulders fixed with respect to said movable cable assembly;

a series of longitudinally spaced drive dogs on said chain extending outwardly thereof so as to operatively and drivingly engage successively the respective driving shoulders;

a push-out bar adjacent said support bearing against the chain loop, adjacent said cable assembly for maintaining said connected drive dogs in successive driving registry with said driving shoulders respectively, a power driven sprocket opposite said first power driven sprocket and a longitudinally spaced sprocket carried by said support opposite said second longitudinally spaced sprocket upon the other side of said track;

a second sprocket chain loop interconnecting said latter sprockets;

a series of longitudinally spaced dogs on said second chain extending outwardly thereof so as to operatively and drivingly engage successively the respective driving shoulders;

and a second push-out bar adjacent said support bearing against the second chain loop, adjacent said cable assembly for maintaining said connected drive dogs in successive driving registry with said driving shoulders respectively, the opposed dogs on the two sprocket chains coming into engaging registry with said shoulders between said pair of push-out bars for cooperative pushing engagement therewith.

5. In the caterpillar drive of claim 4, said dogs having opposed semi-cylindrical grooves to cooperatively engage around the adjacent cable element.

6. In the caterpillar drive of claim 4, the opposing edges of each shoulder being carried by a trolley and being tapered outwardly, the leading edges of said dogs being similarly tapered for cooperative driving engagement with said trolleys with the driving forces projected axially of the cable assembly, said cooperating drive dog and conveyor trolley tapers facilitating lateral friction-free disengagement of said dogs from said conveyor trolley as the next succeeding pair of dogs move into driving engagement with the next succeeding conveyor trolley.

7. In the caterpillar drive of claim 4, said push-out bars each having an outwardly tapered leading portion extending away from the conveyor assembly, the inner opposing faces of each cooperating pair of dogs being convex to effect cooperative camming engagement with each other as they pass over the tapered portion of said push-out bars facilitating friction-free disengagement of said dogs from said driving shoulders.

8. In the caterpillar drive of claim 4, and a power drive means mounted on said support means and including a pair of spaced parallel drive shafts connected to said driven sprockets respectively, and power drive elements secured to each of said shafts, a pair of spaced stops on one of said power drive means, a drive yoke secured to the other of said power drive means and projecting between said stops, and means varying the position of said stops and said yoke with respect to each other for adjusting a shaft relative to an associated power drive element providing a means of adjusting the drive dogs on one chain into opposed registry with the drive dogs on the other chain.

9. The structure set forth in claim 4 wherein said movable cable assembly includes connecting portions between trolleys flexibly interconnecting adjacent pairs of conveyor trolleys, and said dogs being spaced so that the distance between a given dog, when in engagement with a given shoulder, and the next preceding dog is less than the distance from said given shoulder to the next preceding shoulder such that said given dog then driving a given shoulder places succeeding cable connecting portions in tension slightly elongating same and relieving the tension on the next preceding cable connecting portion with consequent shortening thereof and permitting release of the next preceding dog from its shoulder facilitating a friction-free disengagement of said preceding dog as it moves laterally along the line of conveyor movement;

whereby excessive wear of the engaging surfaces of the dogs and the shoulders is avoided.

10. In a trolley conveyor system including, a track, a series of longitudinally spaced conveyor trolleys movably carried by the track, and a movable cable assembly to which the trolleys are secured providing cable connecting portions between trolleys, the improvement comprising:

a plurality of spaced driving shoulders fixed with respect to said cable connecting portions;

a series of driving dogs adapted to successively drivingly engage said shoulders for moving the cable assembly and trolleys on the track;

means driving said dogs on an arcuate path so as to move any given dog into such driving engagement with a given shoulder;

and said dogs being spaced so that the distance between a given dog, when in engagement with a given shoulder, and the next preceding dog is less than the distance from said given shoulder to the next preceding shoulder such that said given dog then driving a given shoulder places succeeding cable connecting portions in tension slightly elongating same and relieving the tension on the next preceding cable connecting portion with consequent shortening thereof and permitting release of the next preceding dog from its shoulder facilitating a friction-free disengagement of said next preceding dog as it moves laterally along the line of conveyor movement; whereby excessive wear of the engaging surfaces of the dogs and the shoulders is avoided.

References Cited by the Examiner
UNITED STATES PATENTS

| | | | |
|---|---|---|---|
| 2,168,852 | 8/39 | Webb | 198—203 |
| 3,032,173 | 5/62 | King | 198—177 |

SAMUEL F. COLEMAN, *Primary Examiner.*